United States Patent [19]

Akiyama et al.

[11] Patent Number: 5,170,201
[45] Date of Patent: Dec. 8, 1992

[54] CLOSE-UP CONTROL METHOD AND APPARATUS FOR VARIABLE FOCAL LENGTH CAMERA

[75] Inventors: Kazuhiro Akiyama; Masaya Nozawa; Minoru Takahashi; Mitsuo Yokota, all of Saitama, Japan

[73] Assignee: Fuji Photo Film Co., Ltd., Kanagawa, Japan

[21] Appl. No.: 694,686

[22] Filed: May 2, 1991

[30] Foreign Application Priority Data

May 2, 1990 [JP] Japan ................................. 2-116355

[51] Int. Cl.⁵ ............................................ G03B 13/00
[52] U.S. Cl. ................................ 354/400; 354/195.12
[58] Field of Search ................ 354/400, 195.12, 195.1

[56] References Cited

U.S. PATENT DOCUMENTS 4,951,075  8/1990  Tokumaru et al. ................. 354/400

Primary Examiner—Michael L. Gellner
Assistant Examiner—David M. Gray
Attorney, Agent, or Firm—Young & Thompson

[57] ABSTRACT

A variable focal length camera has a lens barrel movable parallel to the optical axis of its taking lens system so as to change over the focal length of the taking lens system at least between a standard photography position and a telephoto position. When the subject distance is nearer than the nearest focusable distance for standard photography or for telephotography, the lens barrel is automatically moved into a first close-up position if the lens barrel has been in the standard photography position, whereas the lens barrel is moved into a second close-up position if the lens barrel has been in the telephoto position.

15 Claims, 6 Drawing Sheets

CLOSE-UP CONTROL METHOD AND APPARATUS FOR VARIABLE FOCAL LENGTH CAMERA

BACKGROUND OF THE INVENTION

The present invention relates to a variable focal length camera, and more particularly to a control method and apparatus for close-up photography using a variable focal length lens having a telephoto close-up function and a standard close-up function.

There are known two types of variable focal length (vari-focal) lenses, including dual focal lenses and zoom lenses, that have a close-up or macro function, namely, a telephoto close-up type and a standard close-up type The telephoto close-up type is one in which the photographic state thereof is changeable from a telephoto state to a close-up state, while the standard close-up type is one in which the photographic state thereof is changeable from a standard state to a close-up state. The standard close-up type generally has a close-up magnification less than that of the telephoto close-up type, but has a nearer focusable distance.

Conventional variable focal length cameras have a telephoto close-up type vari-focal lens, so that changing over from a standard photography state to a close-up photography state cannot be quickly carried out because it is necessary to pass through a telephoto state. In a camera wherein a small stepping motor is used for focusing so as to lower the cost, since also the speed of focusing is low, it is impossible quickly to set the taking lens in an appropriate position. In order to speed up the taking lens positioning, it is possible to reduce the amount of lens movement. But, this would increase the nearest focusable distance in standard photography, for example, up to 0.8-1.0 m, so that the camera would not be focusable on a subject disposed nearer than this nearest focusable distance. Furthermore, conventional variable focal length cameras having a close-up function need a manual operation for changing over the taking lens to its close-up state, so that even when a principal subject is in focusable range for the close-up state, if the camera is set to a telephoto or standard size, the image of the subject will be out of focus.

SUMMARY OF THE INVENTION

In view of the foregoing, an object of the invention is to provide a control method and apparatus for close-up photography wherein it is possible to change over a taking lens quickly between a close-up photography state and a standard photography state, on the one hand, and between a close-up state and a telephoto state, on the other hand.

Another object of the invention is to provide a control method and apparatus for close-up photography wherein, when a subject is disposed nearer than a nearest focusable distance for a standard photography or telephoto state, the taking lens is automatically set in either a standard close-up state or a telephoto close-up state depending on the photographic state in which the taking lens has been set.

To achieve the above and other objects, according to the present invention, a vari-focal lens is provided with a telephoto close-up function and a standard close-up function so as respectively to change over a taking lens system from a telephoto state to a close-up state, on the one hand, and from a standard state to a close-up state, on the other hand.

According to a preferred embodiment of the present invention, subject distance data from an autofocus device are utilized such that if the subject distance is nearer than the nearest focusable distance, the taking lens system is automatically moved into one the two close-up states that is the nearest to the existing photographic state.

According to the present invention, because the vari-focal lens has two kinds of close-up functions, it is possible quickly to change over the taking lens into one of the close-up states. Furthermore, the camera is automatically set in one of the close-up states when the subject is disposed in a range nearer than a predetermined distance.

BRIEF DESCRIPTION OF THE DRAWINGS

The above and other objects and advantages of the present invention will become more apparent from the following detailed description when read in conjunction with the accompanying drawings, in which.

DETAILED DESCRIPTION OF THE PREFERRED EMBODIMENTS

Figure 1:
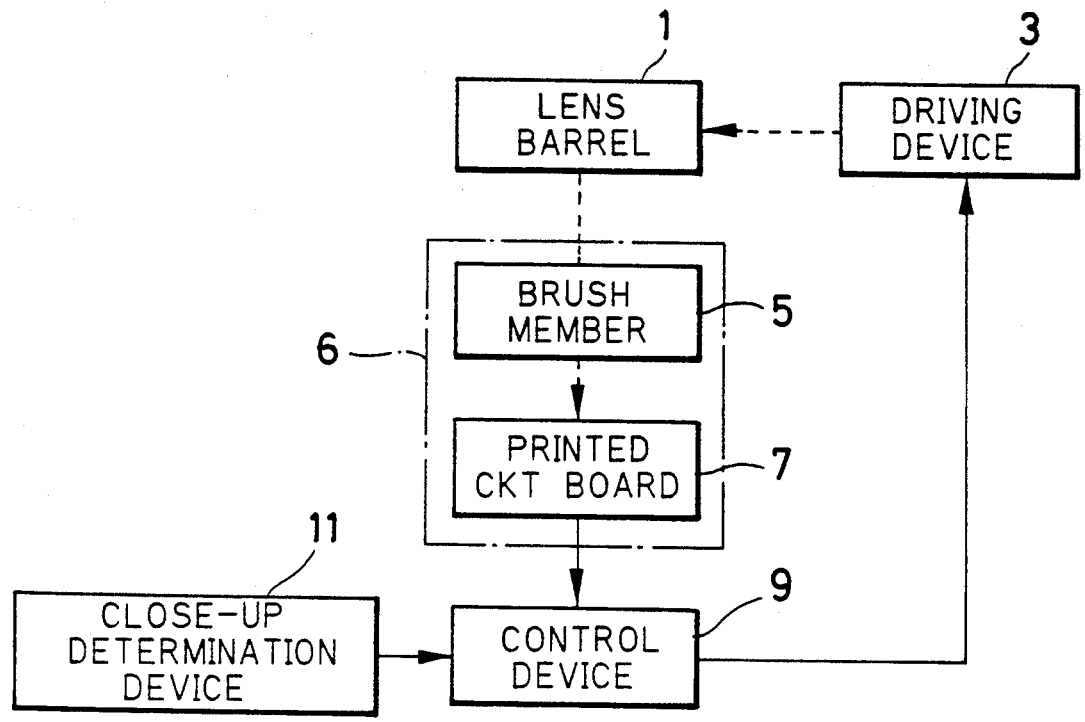
FIG. 1 is a block diagram schematically showing the present invention.

In FIG. 1, a lens barrel 1 is moved by a driving device 3 back and forth in the direction of the optical axis so as to change over the focal length of a taking lens system. A brush member 5 of an encoder 6 is moved in proportion to the movement of the lens barrel 1. A printed circuit board 7 of the encoder 6 is secured to a camera body, and has a contact pattern printed thereon which is switched on and off by the brush member 5 while the brush member moves with the lens barrel 1. Based on the on-off pattern detected by the encoder 6, a control device 9 determines at least a standard photography position and a telephoto position of the lens barrel 1, in order to change over the focal length of the camera at least between the standard and telephoto positions. When a close-up determination device 11 determines that the subject to be photographed is in a distance range nearer than the nearest focusable distance for standard photography and that for telephotography, the control device 9 controls the driving device 3 to move the lens barrel 1 into a first or a second close-up position depending on whether the lens barrel 1 has been in the standard position or in the telephoto position, wherein the lens barrel 1 is set in the first close-up position if it has been set in the standard position, and is set in the second close-up position if it has been set in the telephoto position.

Figure 2:
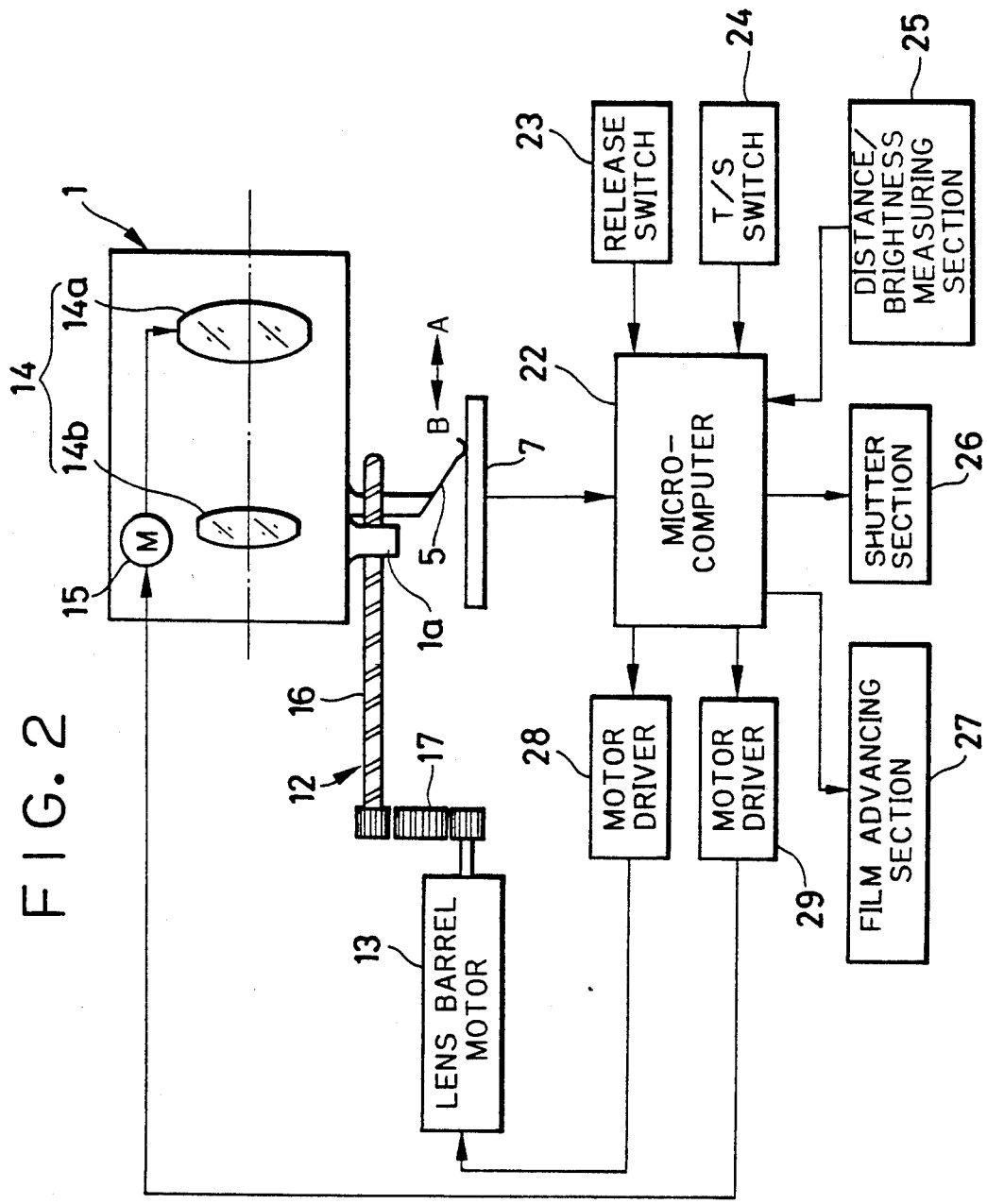
FIG. 2 schematically shows a variable focal length camera according to an embodiment of the present invention.

FIG. 2 shows the overall construction of a camera embodying the present invention, wherein the lens barrel 1 is movable in the optical axis direction when being driven by a bi-directional lens barrel motor 13 through a power transmission mechanism 12. The lens barrel 1 moves forward when the lens barrel motor 13 rotates in one direction (hereinafter referred to as forward direction), and moves backward when the lens barrel motor 13 rotates in the opposite direction. The lens barrel 1 holds a taking lens system 14 including a front lens group 14a and a rear lens group 14b in such a manner that the relative positions of the lens groups 14a and 14b in the optical axis direction and/or the focal length of the taking lens system 14 are changed along with the movement of the lens barrel 1. Furthermore, the front lens group 14a is movable for focusing by a stepping motor 15 disposed in the lens barrel 1, independently of the lens barrel movement.

The power transmission mechanism 12 comprises a guide screw 16 engaging with a female screw 1a formed in the lens barrel 1, and a reduction gear 17 disposed between the guide screw 16 and the lens barrel motor 13, so that the rotational power of the lens barrel motor 13 is transmitted to the guide screw which moves the lens barrel 1 according to the rotational direction of the lens barrel motor 13.

The brush member 5 of an encoder 6 is mounted on the lens barrel 1 such that the brush member 5 moves bi-directionally in proportion to the motion of the lens barrel 1 as shown by a double arrow A-B, wherein the direction A corresponds to the forward direction of the lens barrel whereas the opposite direction B corresponds to the backward or retracting direction. The stationary printed circuit board 7 of the encoder 6 is securely mounted in the camera body, and has a contact pattern 18 which is swept by the brush member 5 to be switched on and off, as is described later with reference to FIG. 3.

Signals detected by the encoder 6 are sent to a microcomputer 22 which controls the overall operation of the camera. The microcomputer 22 receives a release signal from a shutter release switch 23 and a focal length change over signal from a T/S switch 24 which, for example, is formed as a pushbutton switch and is depressed to change over the focal length of the taking lens 14 between a standard photography position and a telephoto position. A distance/brightness measuring section 25 supplies the microcomputer 22 with data on the subject distance and the subject brightness, while a shutter section 26 opens and closes a shutter according to a command from the microcomputer 22. The microcomputer 22 controls a film advancing section 27 so as to advance the film, and also controls motor drivers 28 and 29 for the lens barrel motor 13 and the stepping motor 5, respectively.

Figure 3:
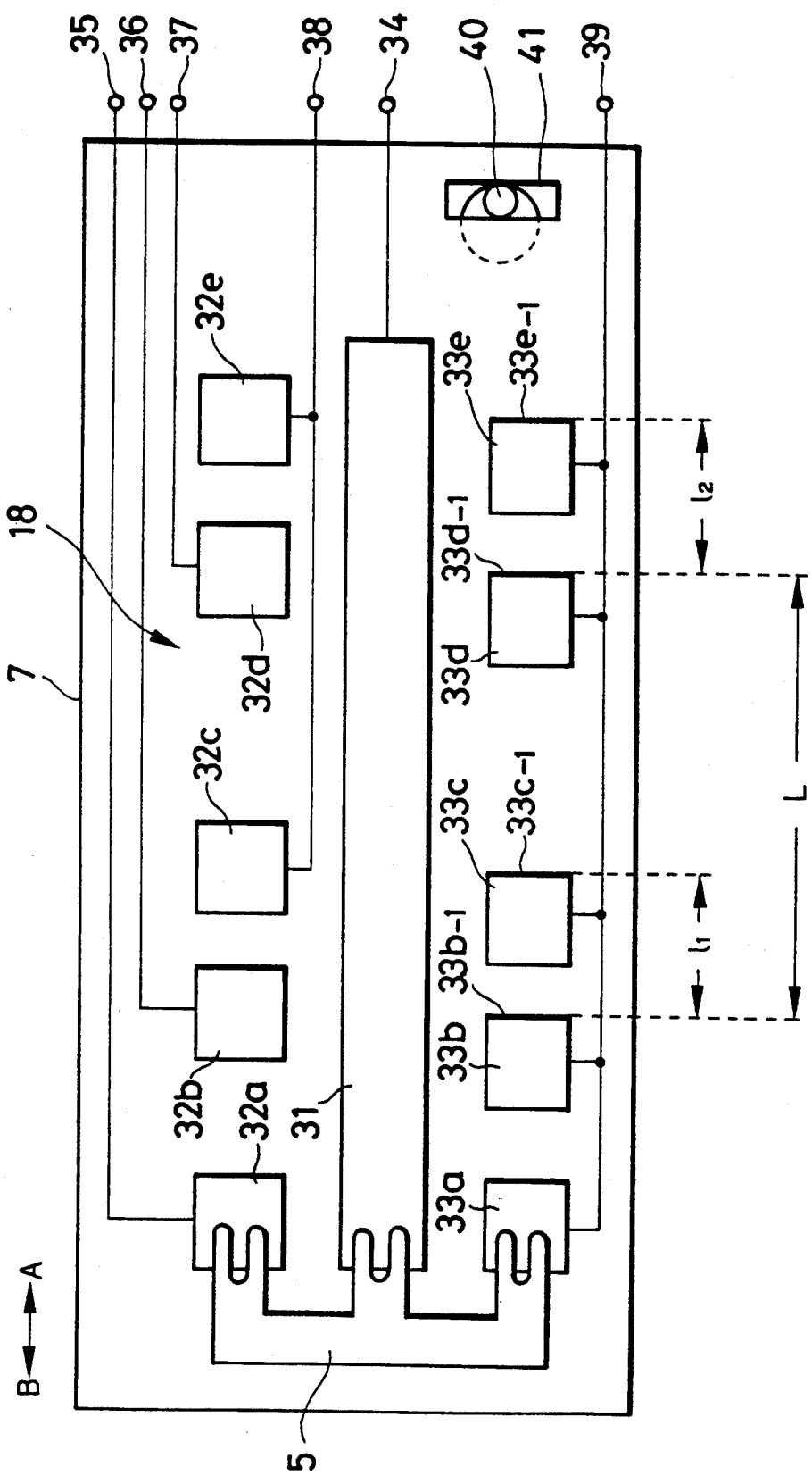
FIG. 3 shows a printed circuit board and a brush of an encoder used in the camera of FIG. 2.

Referring to FIG. 3, the contact pattern 18 is formed on the printed circuit board 7 by etching. The contact pattern 18 consists of two parallel columns of contacts extending in the direction of brush movement, and a common contact 31 extending along substantially the entire length of the first and second columns. The first column consists of five contacts 32a, 32b, 32c, 32d and 32e aligned parallel to the common contact, and the second column also consists of five contacts 33a, 33b, 33c, 33d and 33e aligned parallel to the first column and the common contact 31, but an end of the contacts 33b, 33c, 33d and 33e of the second column is shifted longitudinally in the B direction relative to the same end of the contacts 32b, 32c, 32d and 32e of the first column, respectively, such that the right ends (in the drawings) 33b-1, 33c-1, 33d-1 and 33e-1 of the contacts 33b to 33e are positioned approximately in the middle of the contacts 32b, 32c, 32d and 32e, respectively, with respect to the direction of brush member movement.

The common contact 31 is connected to a terminal 34 through which a voltage is applied to the common contact 31. The contacts 32a, 32b and 32d are respectively connected to individual terminals 35, 36 and 37, while the contacts 32c and 32e are commonly connected to a terminal 38. The contacts 33a to 33e of the second column are connected together to a terminal 39.

The contacts 32a, 32b and 32d of the first column define a retracted position of the lens barrel, a standard photography zone, and a telephoto zone, respectively. The contacts 32c and 32e define a first close-up zone and a second close-up zone, respectively. The contacts 33a, 33b and 33d of the second column, and more particularly the right ends thereof, define lens barrel stop positions for a retracted position, for standard photography, and for telephotography, respectively. The contact 33c, and more particularly the right end thereof 33c-1, defines a first close-up position, that is, a position for close-up photography into which the lens barrel can shift from the standard photography position. The contact 33e, and more particularly the right end thereof 33e-1, defines a second close-up position, that is, a position for close-up photography into which the lens barrel can shift from the telephoto position. It is to be noted that focusing of the taking lens system 14 is performed by changing the focal length in the first and second close-up positions.

The brush member 5 slides on the common contact 31, the first and second contact columns 32a to 32e and 33a to 33e, in accordance with the movement of the lens barrel 1, thereby to switch on and off the contacts of the first and second columns while the common contact 31 will always be in electric contact with the brush 5.

In order to set the lens barrel in the standard position, the lens barrel 1 is stopped at the moment when the brush member 5 passes beyond the right end 33b-1 of the contact 33b while moving in the A direction, and thus the contact 33b is switched off. In order to set the lens barrel in the first close-up position, the lens barrel 1 is stopped at the moment the brush member 5 passes beyond the right end 33c-1 of the contact 33c while moving in the A direction, and thus in the direction to switch off the contact 33c.

In order to set the lens barrel in the telephoto position, the lens barrel 1 is stopped at the moment the brush member 5 passes beyond the right end 33d-1 of the contact 33d while moving in the A direction, and thus the contact 33d is switched off. In order to set the lens barrel in the second close-up position, the lens barrel 1 is stopped at the moment the brush member 54 passes beyond the right end 33e-1 of the contact 33e while moving in the A direction, and thus in the direction to switch off the contact 33e for the second close-up position.

That is, the respective reference ends 33b-1, 33c-1, 33d-1, and 33e-1 of the contacts 33b, 33c, 33d and 33e are on the same side, the right side in this embodiment, with respect to the direction of brush movement, and the amount of lens barrel movement in changing over the focal length between the standard position and the telephoto position is defined by a distance L between the reference ends 33b-1 and 33d-1, while the amount of lens barrel movement in changing over the focal length between the standard position and the first close-up position is defined by a distance $l_1$ between the reference ends 33b-1 and 33c-1, and the amount of lens barrel movement in changing over between the telephoto position and the second close-up position is defined by a distance $l_2$ between the reference ends 33d-1 and 33e-1. Therefore, even if the reference ends are displaced from their proper positions because of an over-etching or under-etching in forming the contact pattern 18, because all the contacts of the contact pattern 18 are formed on the same printed circuit board 7 under the same etching conditions, the deviation of the reference ends will be substantially equal in amount and direction to each other, so that the distances L, $l_1$ and $l_2$ will scarcely be changed in spite of over- or under-etching.

Figure 4:
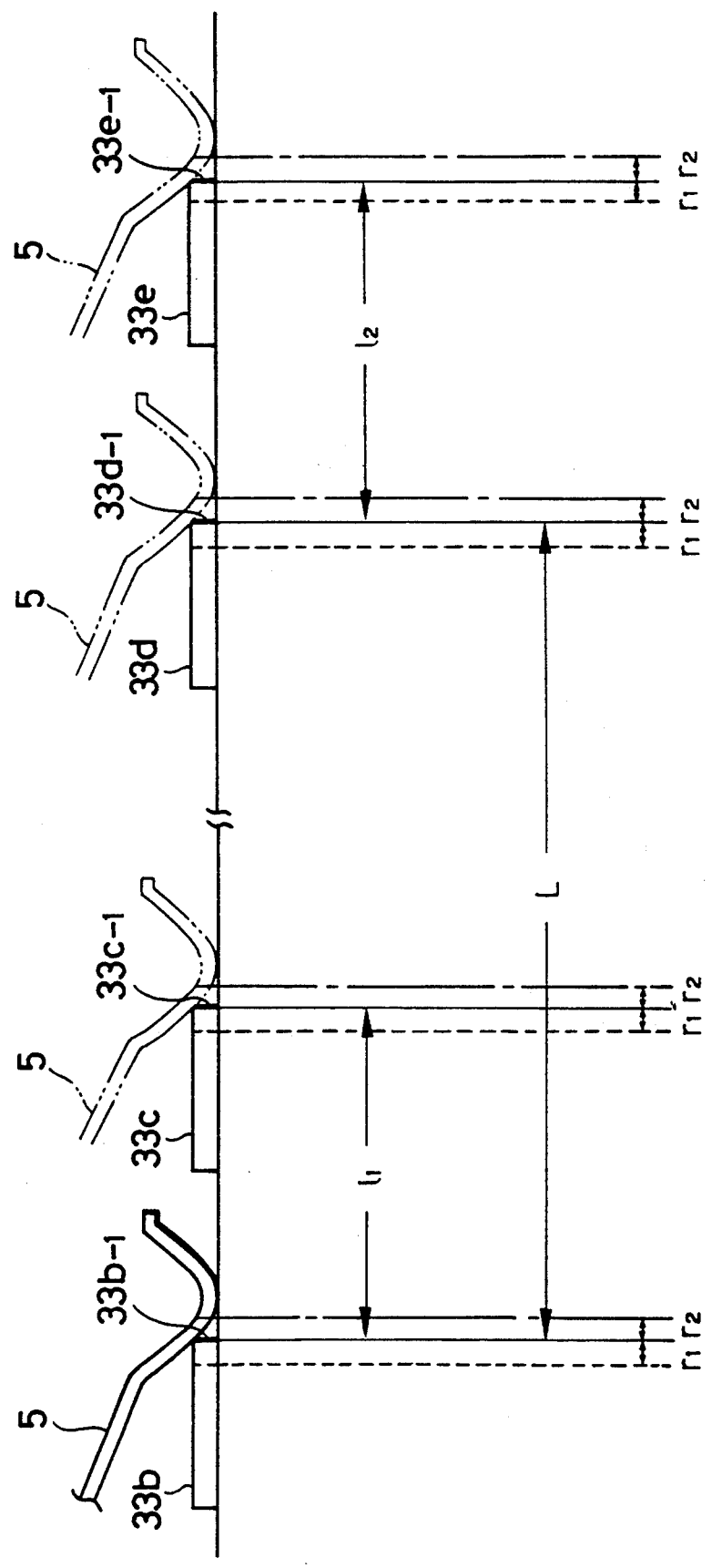
FIG. 4 is a view for explaining the spacing between the reference ends of the respective contacts on the circuit board.

For example, if each length of the contacts 33b, 33c, 33d and 33e decreases by an amount r1 at each of its ends because of over-etching, as indicated by dashed lines in FIG. 4, the distance between the reference ends 33b-1 and 33d-1 becomes $L+r1-r1=L$. In the same way, the distance between the reference ends 33b-1 and 33c-1 as well as the distance between the reference ends 33c-1 and 33e-1 will be unchanged because $l_1+r1-r1=l_1$ and $l_2+r1-r1=l_2$. If, on the other hand, each length of the contacts 33b, 33c, 33d and 33e increases by an amount r2 at each of its ends because of under-etching, as indicated by chain-dotted lines in FIG. 4, the distance between the reference ends 33b-1 and 33d-1 becomes $L-r2+r2=L$. In the same way, the distance between the reference ends 33b-1 and 33c-1 as well as the distance between the reference ends 33c-1 and 33e-1 would not be changed because $l_1-r2+r2=l_1$ and $l_2-r2+r2=l_2$.

Figure 5:
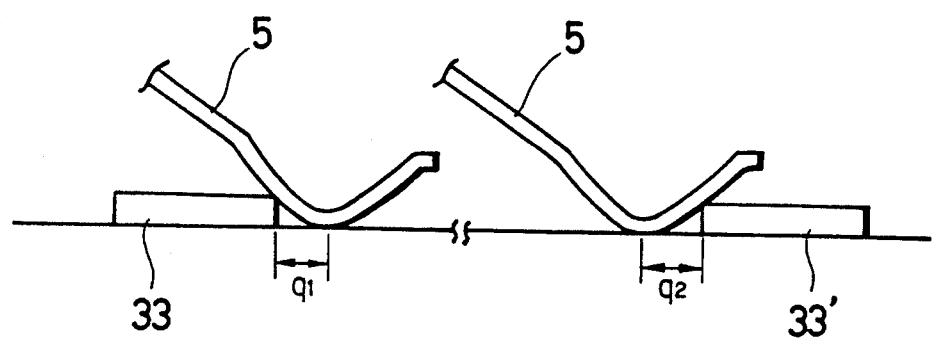
FIG. 5 is a view explaining the relationship between the two ends of the contact and the position of the brush member.

As shown in FIG. 5, if a first lens barrel position corresponds to the position wherein a contact 33 is switched off at an end thereof, i.e. the forward end with respect to the direction of brush movement, while a second lens barrel position corresponds to the position wherein a contact 33' is switched on at the opposite end thereof, i.e. the rearward end with respect to the direction of brush movement, the first lens barrel position is detected at the moment the rearward arm of the brush member 5 leaves the forward end of the contact 33, and the second lens barrel position is detected at the moment when the forward arm of the brush member 5 comes into contact with the rearward end of the contact 33'. Accordingly, if the angles of both arms of the brush member 5 are not the same relative to the board surface, as shown in FIG. 5, it would be impossible precisely to determine the lens barrel position based on the on-off condition of the contact because the distance q1 is not equal to the distance q2.

However, according to the above embodiment of the invention, because the reference ends 33b-1 and 33e-1 of the contacts 33b to 33e are on the same side with respect to the direction of brush movement, and the respective lens positions are always detected when the rearward arm of the brush member 5 leaves the associated reference ends, as is shown in FIG. 4, the accuracy of the lens barrel position is not lost even if the angles of the brush arms relative to the board surface are not the same at the front and rear of the contacts.

If the stop position were to be detected when the brush member 5 switches on the contact, the brush member 5 would strike the shoulder of the contact and then step up onto the contact at that moment, so that there would be a relatively high possibility of chattering. On the contrary, according to the above embodiment, because the lens barrel 1 is stopped when any of the contacts 33b to 33e is switched off at the reference end thereof, that is, when the brush member 5 steps down from the contact, the possibility of chattering is reduced.

The printed circuit board 7 of the encoder 6 is, before being secured to the camera body, adjusted with respect to the position thereof in the direction of brush movement, for instance, such that the contact 33b is switched off at the reference end 33b-1 thereof exactly when the lens barrel 1 is positioned in the proper standard photography position. For this purpose, an eccentric pin 40 is pivotally mounted on the camera body, and the printed circuit board 7 is formed with an opening 41 into which a tip of the eccentric pin 40 is inserted (FIG. 3). In this way, it becomes possible to adjust the position of the printed circuit board 7 relative to the camera body and thus relative to the brush member 5 in the direction of brush movement, by rotating the eccentric pin 40. The printed circuit board 7 is thereafter secured to the camera body by means of screw bolts or the like.

The operation of the above-described camera will now be described with reference to the flow charts shown in FIGS. 6 and 7.

Figure 6:
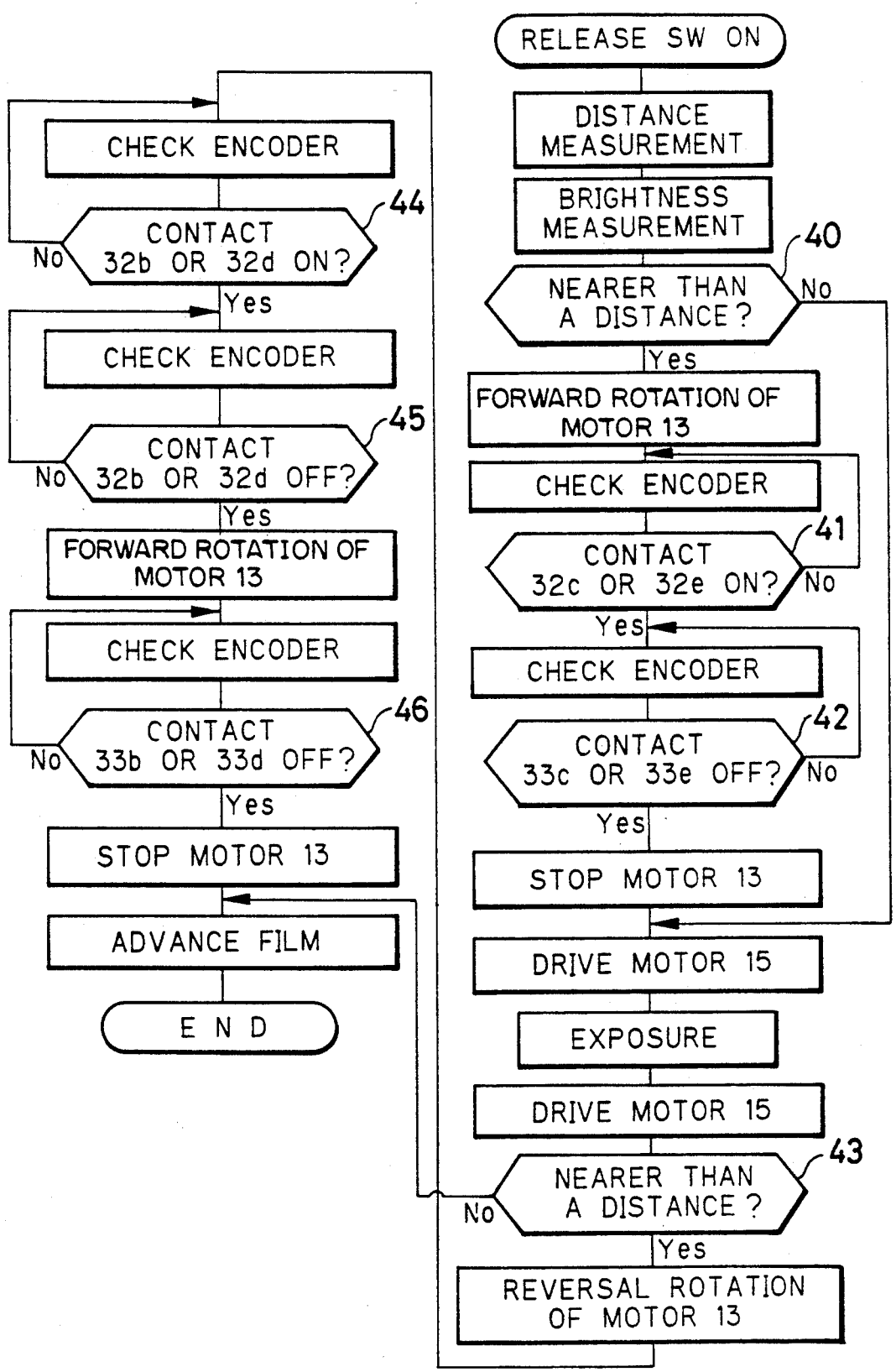
FIG. 6 is a flow chart of a sequence of close-up photography in the camera of FIGS. 2 and 3.

The microcomputer 22 operates according to the sequence of FIG. 6 in close-up photography. It is to be noted that the movement into and the stopping of the lens barrel 1 in the retracted position as well as movement from the retracted position is controlled in a conventional manner.

Upon depression of the shutter release switch 23 after the lens barrel 1 has moved forward into the standard or the telephoto position, the distance and brightness measuring section 25 measures the subject distance and the subject brightness. Based on the measured data as to the subject distance, it is determined whether the subject distance is nearer than the nearest focusable distance predetermined for standard photography and that predetermined for telephotography (judgment step 40).

If it is determined in step 40 that the subject distance is nearer than the both nearest focusable distances, then the lens barrel motor 13 is driven to rotate forwardly and thus to move the lens barrel 1 forward. While the lens barrel 1 is moving forward, output signals from the encoder 6 are read into the microcomputer 22. Based on these output signals from the encoder 6, it is firstly determined whether either of the contacts 32c and 32e for the first and second close-up zones is switched on (judgment step 41). If the contact 32c or 32e is switched on, step 41 proceeds to the next procedure, wherein it is determined based on the output signals from the encoder 6 whether either of the contacts 33c and 33e for the first and second close-up position is switched off (judgment step 42). When the brush member 5 passes beyond the reference end 33c-1 of the contact 33c or the reference end 33e-1 of the contact 33e in the direction to switch off the contact 33c or 33e, then the motor 13 is stopped.

If the lens barrel 1 has been set in the standard position before the shutter release operation, it will be determined that the first close-up zone contact 32c is switched on in step 41, and that the first close-up position contact 33c is switched off in step 42. If, on the other hand, the lens barrel 1 has been set in the telephoto position before the shutter release operation, it will be determined that the second close-up zone contact 32e is switched on in step 41, and that the second close-up position contact 33e is switched off in step 42.

Next, the stepping motor 15 is driven for focusing of the taking lens 14 on the basis of the data on the subject distance, and then the shutter section 26 is actuated to make an exposure on the basis of the data on subject brightness. After the exposure, the stepping motor 5 is driven to return the taking lens 14 to its initial position. Thereafter, it is again determined whether the subject distance is nearer than the nearest focusable distance for standard photography and that for telephotography (judgment step 43).

If the subject distance is determined to be nearer than both nearest focusable distances in step 40, the lens barrel motor 13 is not driven, and also the encoder 6 is not checked. Instead, focusing and exposure are immediately performed, and thereafter the judgment of step 43 is executed.

If the answer is "no" in step 43, then the film advancing section 27 is driven to advance the film by one frame for the next exposure.

If the answer is "yes" in step 43, then the lens barrel motor 13 is driven in the opposite direction to move back the lens barrel 1. While the lens barrel 1 is moving back, the output signals from the encoder 6 are read into the microcomputer 22. Based on these output signals, it is determined whether either of the contact 32b for the standard photography zone and the contact 32d for the telephotography zone is switched on (judgment step 44), and when the contact 32b or 32d is switched on, then it is determined whether the contact 32b or 32d is switched off. Upon the contact 32b or 32d being switched off, the lens barrel motor 13 reverses its rotational direction and rotates forwardly, thereby to move the lens barrel 1 forward. While the lens barrel 1 is moving forward, it is then determined based on the output signals from the encoder whether either of the contacts 33b and 33d is switched off. When the brush member 5 passes beyond the reference end 33b-1 or 33d-1 of the contact 33b or 33d in the direction to switch off the corresponding contact 33b or 33d, then the lens barrel motor 13 is stopped.

Accordingly, if the lens barrel 1 has been in the first close-up position in step 43, it will be determined that the standard photography zone contact 32b is switched on and then off in steps 44 and 45, and that the contact 33b for the standard position is switched off in step 46. If the lens barrel 1 has been in the second close-up position in step 43, it will be determined that the telephoto zone contact 32d is switched on and then off in steps 44 and 45, and that the contact 33d for the telephoto position is switched off in step 46.

After the lens barrel motor 13 stops upon detecting the switching-off of the contact 33b or 33d in step 46, the film advancing section 27 is driven to advance the film by one frame, thereby to prepare the camera for the next exposure.

Figure 7:
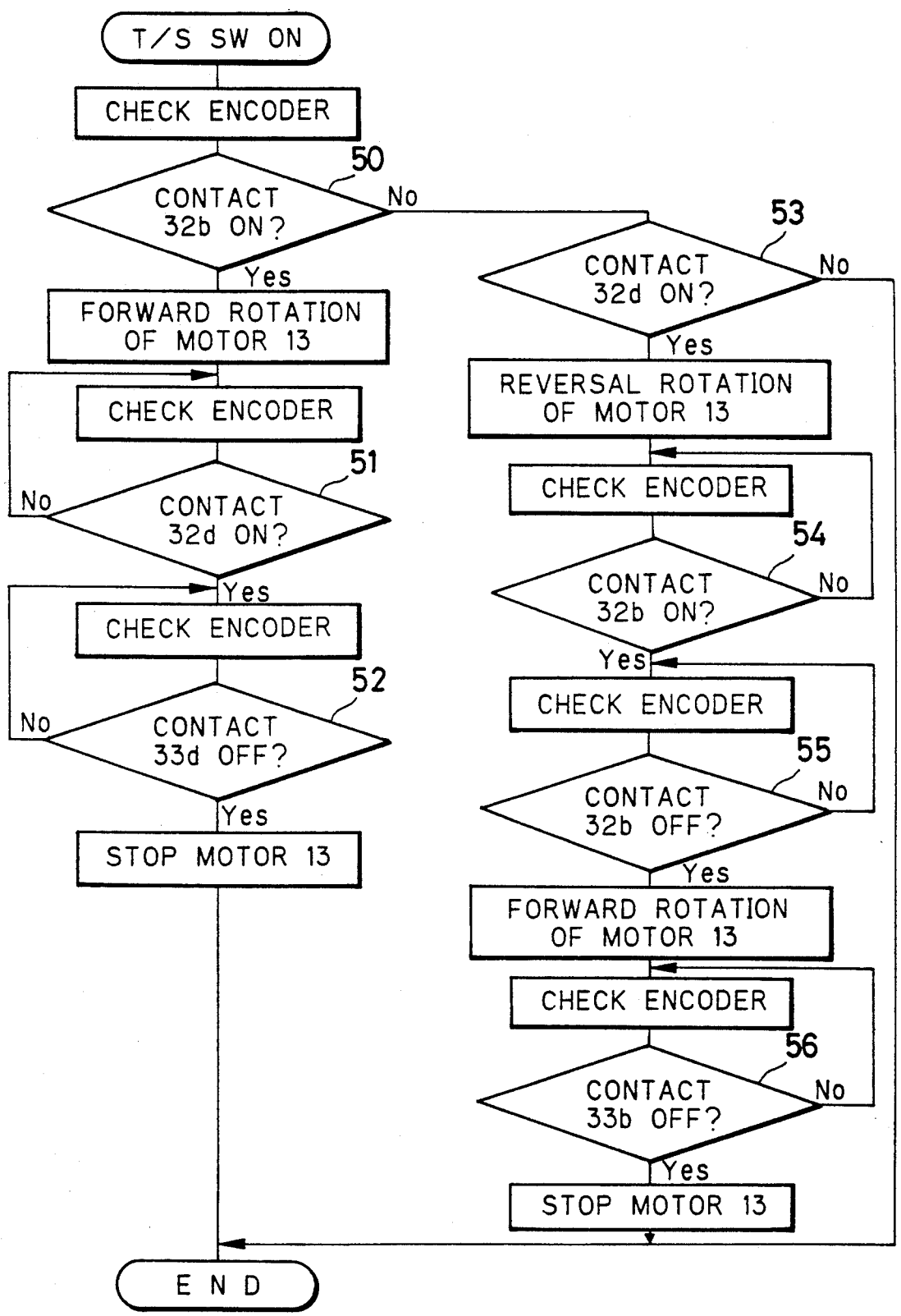
FIG. 7 is a flow chart of a sequence for changing the lens barrel between a standard photography position and a telephoto position.

When changing over the lens barrel 1 between the standard photography position and the telephoto position, the microcomputer 22 operates according to the sequence of FIG. 7. Upon depression of the T/S switch 24, at first the output signals are read out from the encoder 6. Based on the output signals from the encoder, it is determined whether the standard photography zone contact 32b is switched on (step 50). If the lens barrel 1 is changed over from the standard to the telephoto position, because the lens barrel 1 has been in the standard position, the standard photography zone contact 32b is switched on, so that the lens barrel motor 13 is rotated forwardly thereby to move the lens barrel 1 forward. While the lens barrel 1 is moving forward, the output signals are read out from the encoder 6 so as to determine whether the telephoto zone contact 32d is switched on (step 51). After the telephoto zone contact 32d is switched on, it is determined based on the output signals from the encoder 6 whether the contact 33d for the telephoto position is switched off (step 52). When the brush member 5 passes beyond the reference end 33d-1 of the telephoto position contact 33d in the direction to switch off that contact 33d, the lens barrel motor 13 is stopped.

If the lens barrel 1 is changed over from the telephoto position to the standard position, it is determined in step 50 that the standard photography zone contact 32b is not switched on, so that a determination whether the telephoto zone contact 32d is switched on is performed (step 53). Because, in this case, the contact 32d has been switched on, the lens barrel motor 13 is rotated reversely to move back the lens barrel 1 in response to the depression of the T/S switch 24. While the lens barrel 1 is moving back, it is determined based on the output signals from the encoder 6 whether the standard photography zone contact 32b is switched on (step 54), and thereafter it is determined whether the contact 32b is switched off (step 55). Upon the contact 32b being switched off, the lens barrel motor 13 reverses its rotational direction to rotate forwardly, and thus to move the lens barrel 1 forward. While the lens barrel 1 is moving forward, it is determined whether the standard position contact 33b is switched off (step 56). When the brush member 5 passes beyond the reference end 33b-1 of the standard position contact 33b in the direction to switch off that contact 33b, the lens barrel motor 13 is stopped.

Although the invention has been described in detail above with reference to preferred embodiments, various modifications within the scope and spirit of the invention will be apparent to persons skilled in this technological field. For example, the stepping motor for focusing may be connected to the rear lens group instead of the front lens group. It is to be noted, that the standard photography position and the telephoto position are relative focal length positions, and it may be possible to change over the focal length between a telephoto and a wide-angel position, or between a standard and a wide-angle position.

Furthermore, the present invention is applicable to a zoom lens whose magnification is continuously changeable. In the case of a zoom lens whose focal length is changeable in a range from 35 to 105 mm, the range 35-60 mm, for instance, may be designated to be a standard photography state or region, and the range more than 60 mm may be designated to be a telephoto state. The present invention may be applied to a camera having a conversion lens. Although the nearest focusable distance for the standard photography state is the same as for the telephoto state in the above-described embodiment, the nearest focusable distances may, of course, be different form each other. In such case, the determination as to whether the present subject distance is within the focusable distance range is performed according to the existing photographic state. It may also be possible to change over the taking lens system into a close-up state by manually operating the lens barrel.

Thus, the invention should be considered as being limited only by the scope of the appended claims.

What is claimed is:

1. A close-up photography control apparatus for a camera having a movable lens barrel for holding a taking lens system therein, and lens barrel driving means for moving said lens barrel in the direction of the optical axis of said taking lens system so as to change the focal length of said lens system, said control apparatus comprising:

an encoder for outputting a plurality of signal patterns according to the position of said lens barrel, said signal patterns indicating a standard photography position, a telephoto position, a first close-up position for close-up photography into which said lens barrel can shift from said standard photography position, and a second close-up position for close-up photography into which said lens barrel can shift from said telephoto position, said encoder comprising a brush member movable in proportion to said lens barrel, and a contact pattern provided on a stationary printed circuit board and adapted to be swept by said brush member, said contact pattern including at least a column of contacts for defining a standard photography zone, a first close-up zone, a telephoto zone, and a second close-up zone covering respectively said standard photography position, said first close-up position, said telephoto position and said second close-up position;

a close-up determination means for determining whether the distance to a subject to be photographed is nearer than a minimum focusable distance predetermined for said telephoto position and a minimum focusable distance predetermined for said standard photography position; and control means for controlling said lens barrel driving means, such that if said close-up determination means determines that said distance to said subject is nearer than said minimum focusable distances, said control means controls said lens barrel driving means to move said lens barrel into said first close-up position when said lens barrel is in said standard photography position, and into said second close-up position when said lens barrel is in said telephoto position.

2. A close-up photography control apparatus as defined in claim 1, wherein the position of the lens barrel is detected only upon the brush member leaving a contact of said contact pattern.

3. A close-up photography control apparatus as defined in claim 1, wherein said contact pattern comprises a second column of contacts parallel to said first column, said second column comprising contacts for defining respectively said standard photography position, said first close-up position, said telephoto position and said second close-up position.

4. A close-up photography control apparatus as defined in claim 3, wherein one end of each contact of said second column is shifted from one end of an adjacent contact of said first column toward a first direction of brush member movement such that said brush member switches off each contact of said second column prior to said adjacent contact of said first column when moving in a second direction opposite to said first direction.

5. A close-up photography control apparatus as defined in claim 4, wherein said one end of said second column contacts correspond respectively to said standard photography position, said first close-up position, said telephoto position, and said second close-up position, and said control means stops said lens barrel driving means when said brush member switches off an appropriate one of said second column contacts while moving in said second direction.

6. A close-up photography control apparatus as defined in claim 5, wherein said contacts for defining said first close-up zone and said second close-up zone are connected to a common output terminal, and said contacts for defining said standard photography zone and said telephoto zone are connected to individual output terminals, whereas all of said second column contacts are connected to another common output terminal.

7. A close-up photography control apparatus as defined in claim 1, wherein said close-up determination means includes automatic subject distance measuring means.

8. A close-up photography control apparatus as defined in claim 1, further comprising switch means for actuating said control means to change over said lens barrel between said standard photography position and said telephoto position.

9. A close-up photography control apparatus as defined in claim 1, further comprising a stepping motor for focusing, said stepping motor moving said taking lens system independently of said lens barrel driving means.

10. A close-up photography control apparatus as defined in claim 9, wherein said taking lens system comprises a front lens group and a rear lens group, and said stepping motor selectively moves one of said front and rear lens groups.

11. A method of controlling close-up photography for a variable focal length camera having a lens barrel movable in the direction of the optical axis of a taking lens system held therein thereby to change the focal length of said taking lens system, and an encoder comprising a brush member movable in proportion to said lens barrel along a contact pattern switched on and off by said brush member, said contact pattern including at least a column of contacts for defining a standard photography zone, a first close-up zone, a telephoto zone, and a second close-up zone covering respectively said standard photography position, said first close-up position, said telephoto position and said second close-up position; said method comprising the steps of:

monitoring signal patterns output from said encoder;

detecting an existing position of said lens barrel based on said signal patterns;

setting said lens barrel in a predetermined standard photography position or in a predetermined telephoto position;

determining whether a subject to be photographed is disposed in a range nearer than a predetermined minimum focusable distance;

moving said lens barrel into a first close-up position when it is determined that said subject is in said nearer range and said lens barrel is in said standard photography position; and moving said lens barrel into a second close-up position when it is determined that said subject is in said nearer range and said lens barrel is in said telephoto position.

12. A method as defined in claim 11, wherein said lens barrel is always stopped immediately after moving in one direction.

13. A method as defined in claim 12, wherein said lens barrel is always stopped upon said brush member passing beyond an end of an appropriate contact of said contact pattern in said one direction as to switch off said contact.

14. A method as defined in claim 12, wherein said lens barrel is moved into said standard photography position after an exposure is performed at said first close-up position.

15. A method as defined in claim 12, wherein said lens barrel is moved into said telephoto position after an exposure is performed at said second close-up position.

* * * * *